3,131,203
PHENAZASILINE COMPOUNDS
Arthur E. Erickson, Cranford, Roger J. Tull, Plainfield, and William A. Sklarz, Rahway, N.J., assignors to Merck & Co., Rahway, N.J., a corporation of New Jersey
No Drawing. Filed Mar. 31, 1961, Ser. No. 99,718
2 Claims. (Cl. 260—448.2)

This invention relates to antioxidants for high temperature lubricants and more particularly to a new process for making derivatives of diphenylphenazasiline.

Phenazasiline compounds have been found to be useful as antioxidants in high temperature lubricants, particularly those of the synthetic ester type. The compound 5-ethyl-10,10-diphenylphenazasiline, for example, is capable of withstanding temperatures in the range of 400° F. and higher.

Accordingly, an object of the present invention is to provide an improved synthesis for derivatives of diphenylphenazasiline.

Another object of this invention is to provide a novel synthesis for 5-ethyl-10,10-diphenylphenazasiline.

Still a further object of this invention is to prepare novel compounds which are useful as intermediates in the formation of diphenylphenazasiline derivatives.

Among the other objects is to provide an improved synthesis for 5-ethyl-10,10-diphenylphenazasiline using as a reactant a relatively inexpensive silicon compound.

These and other objects will appear more fully in the disclosure which follows:

According to the present invention there is provided a new and improved process for making diphenylphenazasiline derivatives having the general formula:

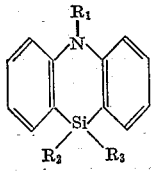

where $R_1$ is a lower alkyl radical and $R_2$ and $R_3$ are either alkyl or aryl radicals. These compounds are useful as antioxidants in high temperature lubricants, particularly in low molecular weight polyhydroxy alcohols. The addition of a phenazasiline derivative to such esters is necessary to prevent oxidation at the high temperature at which these lubricants function.

Novel intermediates having the formula

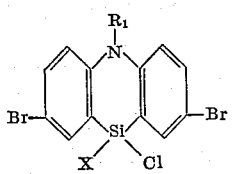

where $R_1$ is as previously defined and X is either an aryl or an alkyl radical or a chlorine atom.

The following flow sheet illustrates the novel process of the present invention.

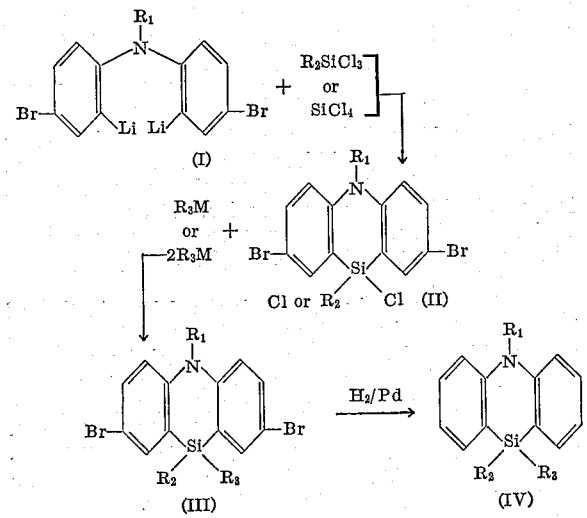

The general course of the reactions will now be illustrated with reference to the use of silicon tetrachloride as the reactant.

The starting compound I may be prepared in the following manner. Diphenylamine is brominated with either bromine or with a brominating agent such as N-bromoacetamide or N-bromosuccinimide or other reagent having a positive bromine atom, thereby forming 2,2',4,4'-tetrabromodiphenylamine. This compound is then alkylated to form 2,2',4,4'-tetrabromo-N-(lower alkyl)diphenylamine. Examples of the compounds thus formed are 2,2',4,4' - tetrabromo - N - methyldiphenylamine and 2,2',4,4'-tetrabromo-N-ethyldiphenylamine. The N-propyl and N-butyl homologs can be similarly prepared. A suitable method of making these compounds is to react 2,2',4,4'-tetrabromodiphenylamine with methyl lithium followed by a dialkyl sulfate such as dimethyl sulfate. For instance, 2,2'4,4'-tetrabromo-N-ethyldiphenylamine can be prepared by reacting diphenylamine with about four moles of bromine, and reacting the resulting 2,2',4,4'-tetrabromodiphenylamine successively with methyl lithium and diethyl sulfate, thereby forming 2,2',4,4'-tetrabromo-N-ethyldiphenylamine. Alternatively these compounds can be formed by direct alkylation with a lower alkyl bromide such as methyl bromide or ethyl bromide.

The 2,2',4,4'-tetrabromo-N-(lower alkyl)diphenylamine is reacted with about two moles of a straight chain lower alkyl lithium containing from 2 to 10 carbon atoms, such as butyl lithium, ethyl lithium, propyl lithium, pentyl lithium, hexyl lithium, decyl lithium and the like, at a temperature not over about 10° C. and preferably about 0° C., in order to form a 4,4'-dibromo-2,2'-dilithio-N-(lower alkyl)diphenylamine (1). Under these conditions there is a highly selective replacement of the bromine atoms at the 2 and 2' positions with lithium, while the 4 and 4' bromine atoms are not attacked. Specific compounds which can be formed according to this reaction include 4,4'-dibromo-N-ethyl-2,2'-dilithio - diphenylamine and 4,4'-dibromo-2,2'-dilithio-N - methyl - diphenylamine. This reaction is carried out in an anhydrous organic solvent such as tetrahydrofuran. An inert atmosphere such as nitrogen or argon covers the reaction medium. It is essential to exclude both oxygen and water from the reaction in view of the reactivity of the alkyl lithium.

One equivalent of the 4,4'-dibromo-2,2'-dilithio-N-(lower alkyl)diphenylamine (I) is then reacted with one equivalent of a compound having the formula, $SiX_4$, where X is a halogen having an atomic weight in the range of 35 to 80, such as silicon tetrachloride. The product of this reaction (II) is a 2,8-dibromo-5-(lower alkyl)-10,10-dichlorophenazasiline.

This step may be illustrated specifically with reference to the reaction of 4,4'-dibromo-N-ethyl-2,2'-dilithio-diphenylamine with silicon tetrachloride to form 2,8-dibromo-5-ethyl-10,10-dichlorophenazasiline. The reaction is preferably conducted at room temperatures in an anhydrous organic solvent, such as ether.

The dibromo derivative (III) of the desired product is then obtained by reacting II with a metallic compound, $R_3M$, where M is lithium or sodium and $R_3$ is aryl or alkyl, such as phenyl lithium, in an equivalent amount necessary to replace the number of halogen atoms present in the 10 position of the phenazasiline. For example, two equivalents of phenyl lithium may be used in the reaction of II to produce 2,8-dibromo-5-ethyl-10,10-diphenylphenazasiline (III).

The final step in the process is the debromination of III to form the desired end product 5-ethyl-10,10-diphenylphenazasiline (IV). The step may be carried out conveniently by reacting III with hydrogen at superatmospheric pressure at 40 p.s.i.g. in the presence of a suitable catalyst. By way of illustration 2,8-dibromo-5-ethyl-10,10-diphenylphenazasiline may be converted to 5-ethyl-10,10-diphenylphenazasiline by hydrogenation over a warmed carbon catalyst in the presence of an acid acceptor.

While silicon tetrachloride has been illustrated as the source of silicon, it will be understood that an alkyl or aryl trichlorosilane, for example, trichlorophenylsilane may be used in its place. In such a case a monochloro derivative (II) is produced requiring only one equivalent of phenyl lithium.

This invention will be illustrated in detail with respect to the specific examples which follow.

EXAMPLE 1

*2,2'-Dilithio-4,4'-Dibromo-N-Ethyl-Diphenylamine*

A solution of 42.3 g. (0.25 mole) of diphenylamine in 300 cc. of chloroform is placed in a 1-liter, 3-neck flask equipped with stirrer, thermometer well, condenser, addition funnel, and gas trap. A solution of 159.8 g. (1 mole) of bromine in 140 cc. of glacial acetic acid is added dropwise at the rate of 4 drops per second at room temperature until about 35 cc. had been added. The heat of reaction raises the temperature to 60° C. in 5 minutes. After the initial formation of a solid the solution again becomes clear, and then a voluminous precipitation is formed. The remainder of the solution of bromine in acetic acid is added while the reaction temperature is maintained at 50–60° C. Water is then added, and the reaction mixture is stirred 15 minutes and filtered at 35° C. through a fritted glass Buchner funnel. The filtrate is cooled to 0° C., yielding a second crop of crystals. The combined yield is 115.5 g. (95.5%). Recrystallization from toluene at 0° C. yields 110.5 g. (91.5%) of pure 2,2',4,4'-tetrabromodiphenylamine, M.P. 188.5–189.5° C.

Methyl lithium for use in this example is prepared as follows: Into a 1-liter, 3-neck flask equipped with stirrer, addition funnel, addition tube, condenser and nitrogen inlet tube is placed 10 cc. (about 0.418 g.) of lithium wire in 150 cc. of sodium-dried diethyl ether. The flask is purged with nitrogen and a slow stream of this gas is bubbled through the solvent. About 80 drops of solution consisting of 70.9 g. (0.5 mole) of methyl iodide in 150 cc. of sodium-dried diethyl ether is added to the lithium. The solution becomes hazy, indicating initiation of the reaction.

The rest of the solution of methyl iodide in diethyl ether is added in 90 minutes at a rate sufficient to maintain gentle reflux of the reaction solvent without external cooling. When the addition of methyl iodide is complete, the flask is heated at reflux temperature for 45 minutes. The solution is cooled and filtered through a glass wool plug into a 1-liter flask previously purged of air with dry nitrogen. The flask and filter are washed with 150 cc. of diethyl ether. The flask containing the filtrate is rubber stoppered and secured with a wire strap and allowed to stand overnight at 0° C. A 5 cc. aliquot of the clear supernatant solution is titrated with 1.004 N sulfuric acid. Titration indicated that the concentration of methyl lithium was 0.896 N.

A suspension of 48.5 g. (0.1 mole) of 2,2',4,4'-tetrabromodiphenylamine in 250 g. of dry tetrahydrofuran is placed in a 500 cc. 3-neck flask equipped with stirrer, addition tube, nitrogen inlet tube, addition funnel, and condenser, which has been purged with nitrogen gas. About 116 cc. of the solution of methyl lithium in ether made as described in the preceding paragraph (containing 0.104 mole of methyl lithium) is added dropwise at 20 to 24° C. using external cooling. Evolution of methane gas indicates reaction of the methyl lithium. The reaction mixture is distilled to an overhead boiling point of 65° C. removing the ether and about 221 g. of tetrahydrofuran. A solution of 15.4 g. (0.1 mole) of diethyl sulfate in 20 g. of dry tetrahydrofuran, plus an additional 125 cc. of dry tetrahydrofuran is added. After refluxing for 20 hours most of the solvent is recovered by vacuum distillation. To the reaction mass is added 250 cc. of water, and the mixture is heated for 30 minutes at 95° C. to destroy the excess diethyl sulfate. About 225 cc. of toluene is added to the aqueous portion of the product and heated with stirring. The aqueous layer is separated. The remainder of the water is removed from the toluene solution by azeotropic distillation using a Dean-Stark water trap. The deposited salts are removed by filtration and washed with 25 cc. of toluene. The combined filtrates are cooled to 4° C. for 3 hours and the solid filtered. The solid weighs 20 g. and melts at 129–134° C. The mother liquor is evaporated to yield 28 g. of solid, which is recrystallized from 150 g. of butanol to yield 25.5 g. of product melting at 126–134° C. The product is recrystallized 3 times from dimethylformamide to yield 20.1 g. (39%); M.P. 136.5–138.5° C., max. 2950, E% 296.

*Analysis*: Br, calculated—62.30%. Found—62.41%.

The compound 2,2',4,4'-tetrabromo-N-methyldiphenylamine can be prepared according to the procedure of Example 1 substituting an equivalent quantity of dimethyl sulfate for diethyl sulfate.

EXAMPLE 2

*2,8-Dibromo-5-Ethyl-10-Phenyl-10-Chlorophenazasiline*

To the above solution of the dilithio salt is added at 10° C. during about 20 minutes a solution of trichlorophenylsilane (2.11 g., 0.01 mole) in 20 cc. of ether and the reactants are aged for about 30 minutes at 25° C. to produce thereby the intermediate 2,8-dibromo-5-ethyl-10-phenyl-10-chlorophenazasiline.

EXAMPLE 3

*2,8-Dibromo-5-Ethyl-10,10-Diphenazasiline*

Without isolating the dibromo-5-ethyl-10-phenyl 10-chlorophenazasiline intermediate the reaction solution produced above is cooled to 10° C. and an ethereal solution of (10.8 cc. of 0.926-N 0.01 mole of phenyl lithium) is added during 20 minutes. The reaction mixture is then aged during 30 minutes at 10° and finally during 2 hours at 25° C. The reaction mixture is then cooled to 50° C. and 25 cc. of water is added slowly in an aqueous solution. The combined benzene/ether solution is washed with water and dried over anhydrous sodium solvent. The filtrate is filtered in vacuo to remove the solvent. The crude product is purified by chromatography on acid-washed alumina using a mixture of ether/benzene (1:1) as the eluding solvent. The product produced thereby is 2,8-dibromo-5-ethyl-10,10-diphenylphenazasiline, M.P. 200-202° C. A mixed melting point showed no depression. The yield is 2.68 g. (50% of theory).

EXAMPLE 4

5-Ethyl-10,10-Diphenylphenazasiline

A hydrogenation bottle was loaded with 535 mg. (0.001 mole) of pure 2,8-dibromo-5-ethyl-10,10-diphenylphenazasiline in 3 cc. of benzene. To this was added 250 mg. of 5% palladium on charcoal and 500 mg. of sodium acetate. Hydrogenation was carried out at 25° C. for 4 hours at 35 to 40 p.s.i.g. hydrogen pressure. The charge was filtered and the catalyst cake washed with benzene. The combined benzene filtrates were washed twice with water and dried with anhydrous sodium sulfate. The combined filtrates were taken to dryness. The crude product weighed 377 mg. and melted at 115-125° C. The Beilstein test for halogen was negative. Recrystallization of 353 mg. of crude product from ethanol yielded 310 mg. (88%) of pure 5-ethyl-10,10-diphenylphenazasiline; M.P. 122-124° C. A mixed melting point with authentic 5-ethyl-10,10-diphenylphenazasiline showed no depression of the melting point.

EXAMPLE 5

5-Ethyl-10,10-Diphenylphenazasiline Using Silicon Tetrachloride

By reaction with silicon tetrachloride following the procedure described above in Examples 1 to 4, and the ethereal solution of N-butyl lithium (18.2 cc. of N solution, 0.02 mole) is added during 20 minutes under nitrogen to a stirred solution of 5.12 g. (0.01 mole) of 2,2',4,4'-tetrabromo-N-ethyl-diphenylamine in 40 cc. of dry ether. The reaction mixture is then aged at 0° C. for one hour to produce the dilithio compound as above.

The above solution of dilithio salt is added to a solution of 0.02 mole of silicon tetrachloride in 20 cc. of ether and the mixture is aged for 20 minutes at 20° C. The reaction mixture is warmed at 20° C. under reduced pressure and the excess silicon tetrachloride and ether is removed. The produce produced thereby is 2,8-dibromo-5-ethyl-10,10-dichlorophenazasiline.

At this point the reaction residue is diluted with 40 cc. of dry ether, an ethereal solution of phenyl lithium (0.024 mole) is added during 20 minutes. The reaction mixture is then aged for 20 minutes at 10° C. After cooling the reaction mixture is cooled 5° C. and 35 cc. of water is added slowly under nitrogen. The aqueous layer is separated and extracted with benzene (15 cc.). The solution is then washed with water until neutral. The filtered solution is concentrated in vacuo to remove the solvent. The crude product (5.34 g.) is then purified by chromatography on acid-washed alumina using benzene for elution. The product obtained is 2,8-dibromo-5-ethyl-10,10-diphenylphenazasiline. The yield is 2.4 g. (45% of theory).

Following the procedure substantially as described above the product is hydrogenated to produce 5-ethyl-10,10-diphenylphenazasiline.

Using butyl sodium in place of phenyl lithium, the corresponding 5-ethyl-10,10-dibutyl-phenazasiline is produced.

While the invention has been described with particular reference to certain embodiments thereof, it will be apparent to those skilled in the art that other modifications within the scope of the invention may be made.

What is claimed is:
1. Phenazasiline compounds having the formula:

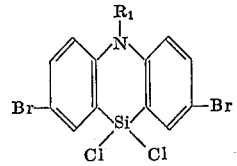

wherein $R_1$ is a lower alkyl radical.

2. Phenazasiline compounds having the formula:

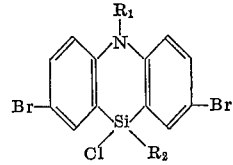

where $R_1$ is a lower alkyl radical and $R_2$ is a radical selected from the group consisting of alkyl and aryl radicals.

References Cited in the file of this patent
UNITED STATES PATENTS

| | | |
|---|---|---|
| 2,386,452 | Fleming | Oct. 9, 1945 |
| 3,065,251 | Jones et al. | Nov. 20, 1962 |
| 3,069,444 | Wasserman et al. | Dec. 18, 1962 |

OTHER REFERENCES

Gilman et al.: "Jour. Am. Chem. Soc.," vol. 80, 1958, pages 1883-6.

Wittenberg et al.: "Jour. Am. Chem. Soc.," vol. 80 (1958), pages 5418-22.

Gilman et al.: "Chemistry and Industry," Sept. 20, 1958, pages 1227-8.